(12) United States Patent
Oberle et al.

(10) Patent No.: US 9,388,865 B2
(45) Date of Patent: Jul. 12, 2016

(54) GEARING MECHANISM

(75) Inventors: Hans-Juergen Oberle, Rastatt (DE);
Wilhelm Braun, Buehl (DE); Willi Schmidt, Stutensee-Buechig (DE);
Siegfried Reichmann, Rheinau Freistett (DE); Roland Braun, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 13/133,534

(22) PCT Filed: Oct. 16, 2009

(86) PCT No.: PCT/EP2009/063526
§ 371 (c)(1),
(2), (4) Date: Aug. 29, 2011

(87) PCT Pub. No.: WO2010/066490
PCT Pub. Date: Jun. 17, 2010

(65) Prior Publication Data
US 2011/0303032 A1 Dec. 15, 2011

(30) Foreign Application Priority Data

Dec. 8, 2008 (DE) .......................... 10 2008 054 377
Sep. 3, 2009 (DE) .......................... 10 2009 029 167

(51) Int. Cl.
*F16D 41/20* (2006.01)
*B60N 2/44* (2006.01)
(Continued)

(52) U.S. Cl.
CPC .............. *F16D 41/206* (2013.01); *B60N 2/443* (2013.01); *B60N 2/444* (2013.01); *F16D 49/02* (2013.01);
(Continued)

(58) Field of Classification Search
CPC ....... F16D 41/20; F16D 41/206; F16D 13/08; F16D 49/02; F16D 43/21
USPC ............ 74/89.39, 89.23, 89.26, 89.34, 89.37; 192/43.2, 76, 81 C, 41 S
See application file for complete search history.

(56) References Cited

U.S. PATENT DOCUMENTS 1,852,935 A * 4/1932 Morier ........................ 192/219.3
2,743,803 A * 5/1956 Ferris ............................ 192/41 A
(Continued)

FOREIGN PATENT DOCUMENTS

JP 2008267437 A * 11/2008
WO 2006/100174 A1 9/2006
(Continued)

OTHER PUBLICATIONS
PCT/EP2009/063526 International Search Report.

*Primary Examiner* — William Kelleher
*Assistant Examiner* — Emily Cheng
(74) *Attorney, Agent, or Firm* — Michael Best & Friedrich LLP (57) ABSTRACT

A gearing mechanism includes a housing component and a shaft mounted in the housing component. The shaft is driven rotating relative to the housing component with regard to a rotation axis in a first rotation direction and in a second rotation direction opposite the first rotation direction. There is also a wrap element that wraps the shaft multiple times. A first end of the wrap element is fastened to the housing component. It is also possible that an inward oriented friction surface is provided and that the wrap element is arranged within the inward oriented friction surface at least in sections in order to interact with the friction surface. In an alternative embodiment, a brake element is provided, the shaft comprises a brake element receptacle that at least partially accommodates the brake element and a contact surface is allocated to the brake element for interacting with the brake element.

10 Claims, 6 Drawing Sheets

(51) Int. Cl.
*F16D 49/02* (2006.01)
*F16D 51/00* (2006.01)
*F16D 67/00* (2006.01)
*F16D 127/00* (2012.01)

(52) U.S. Cl.
CPC ............... *F16D 51/00* (2013.01); *F16D 67/00* (2013.01); *F16D 2127/004* (2013.01); *Y10T 74/18704* (2015.01)

(56) References Cited

U.S. PATENT DOCUMENTS

| | | | | |
|---|---|---|---|---|
| 2,844,236 | A | * | 7/1958 | Cole, Jr. ..................... 192/223.2 |
| 2,870,889 | A | * | 1/1959 | Walton ............................. 192/22 |
| 2,922,220 | A | * | 1/1960 | Sacchini ..................... 29/896.91 |
| 3,092,227 | A | * | 6/1963 | Dossier ....................... 192/41 R |
| 4,760,903 | A | * | 8/1988 | Stegelmeier et al. ............ 192/26 |
| 4,846,324 | A | * | 7/1989 | Ohsawa ........................... 192/35 |
| 5,024,311 | A | * | 6/1991 | Osawa ........................ 192/84.81 |
| 6,158,295 | A | * | 12/2000 | Nielsen ........................ 74/89.38 |
| 7,191,886 | B2 | | 3/2007 | Fluckiger et al. |
| 7,434,493 | B2 | * | 10/2008 | Huang ............................ 81/63.1 |
| 7,705,499 | B2 | | 4/2010 | Drewe et al. |
| 2006/0021841 | A1 | * | 2/2006 | Kimes et al. .................... 192/46 |
| 2006/0054451 | A1 | * | 3/2006 | Klinke ....................... 192/223.4 |
| 2006/0243075 | A1 | | 11/2006 | Liou et al. |
| 2008/0268964 | A1 | | 10/2008 | Kim |
| 2010/0108454 | A1 | * | 5/2010 | Takada et al. ................... 192/43 |

FOREIGN PATENT DOCUMENTS

| | | |
|---|---|---|
| WO | 2008/105401 A1 | 9/2008 |
| WO | 2008/133045 A1 | 11/2008 |
| WO | 2009/059747 A1 | 5/2009 |

* cited by examiner

GEARING MECHANISM

BACKGROUND OF THE INVENTION

The invention relates to a gearing mechanism, in particular a worm gearing mechanism for devices for power-operated adjustment of elements of a motor vehicle. Specifically, the invention relates to the field of gearing mechanisms for axial drives, in particular spindle motors, in devices for adjusting seats or the like.

DE 103 44 211 A1 discloses a device for maintaining the position of an armature shaft, mounted in a rotatable or axially displaceable fashion, of an electric motor. In said document, a wrap-around body is arranged around the shaft, it being possible to apply a force to said wrap-around body in order to bring about frictional engagement between the wrap-around body and a surface of the armature shaft. This force for maintaining a position is applied by an actuator which can be actively actuated and is connected to one end of the wrap-around body.

The device which is known from DE 103 44 211 A1 has the disadvantage that active actuation of the actuator is necessary, with the result that the configuration of the device is relatively complex. Additional components, in particular the actuator and elements for actuating the actuator, are also necessary.

DE 10 2005 012 938 A1 discloses a gearing mechanism drive unit having a load torque lock. The known gearing mechanism drive unit is particularly suitable for a window lifter drive. The known gearing mechanism drive unit has an electric motor which drives a gearing mechanism. The load torque lock locks the torques applied by an output-side clutch element. In this case the load torque lock has a wrap spring. However, this wrap spring is arranged on a rotationally fixed shaft. The wrap spring engages in a gear wheel which is driven on the drive side by a rotor shaft of the electric motor.

SUMMARY OF THE INVENTION

The gearing mechanism according to the invention has the advantage that advantageous promotion of the self-locking properties is made possible. Specifically, rotational-direction-dependent promotion of the self-locking properties of a drive can be achieved.

It is advantageous that the wrap-around body bears at least in certain sections against the shaft, that, when the shaft rotates in the first rotational direction, the spring-elastic wrap-around body which is secured at the first end to the housing component in a positionally fixed fashion is stretched in the first rotational direction in such a way that a cross section of the wrap-around body is reduced and/or a force pressing the wrap-around body against the shaft increases, and that, when the shaft rotates in the second rotational direction, the spring-elastic wrap-around body which is secured at the first end to the housing component in a positionally fixed fashion is compressed in the second rotational direction in such a way that a cross section of the wrap-around body increases and/or a force pressing the wrap-around body against the shaft decreases. It is also advantageous here that, when the shaft rotates in the second rotational direction, the cross section of the wrap-around body is increased in such a way that there is a play between the wrap-around body and the shaft. As a result, rotational-direction-dependent self-locking of the gearing mechanism can advantageously be achieved by means of the wrap-around body. In this context, the wrap-around body can be stretched or compressed on the basis of friction between the wrap-around body and the shaft, as a result of which the frictional force increases or decreases, which brings about the self-locking.

It is advantageous that the wrap-around body has a first limb on which the first end, which is secured to the housing component in a positionally fixed fashion, is provided. In addition it is advantageous that the spring-elastic wrap-around body has a second end, that a first stop, located in a positionally fixed fashion with respect to the housing component, is provided for the second end of the spring-elastic wrap-around body, and that, when the shaft rotates in the first rotational direction, the first stop bounds a movement of the second end of the spring-elastic wrap-around body in the first rotational direction. As a result, the degree of stretching of the spring-elastic wrap-around body can be limited, which also limits the frictional force between the wrap-around body and the shaft, which frictional force brings about the self-locking. As a result, undesired blockage of the shaft can be prevented. In addition, it is possible to take into account the limited torque of an electric motor or the like. This permits desired adjustment of the shaft by means of the electric motor within the characteristic data of the electric motor. The position of the first stop can be predefined here with respect to the maximum desired self-locking and can be adapted to the torque of the electric motor or the like.

It is also advantageous that the wrap-around body is made to extend repeatedly around the shaft, with the result that the spring-elastic wrap-around body wraps around the shaft repeatedly. This makes possible, on the one hand, an advantageous arrangement of the wrap-around body on the shaft, wherein, in particular, the wrap-around body is oriented on the shaft. Furthermore, within certain limits defined ratios are predefined with respect to the frictional force which occurs between the wrap-around body and the shaft, which ensures reliable functioning.

It is also advantageous that the spring-elastic wrap-around body has a second end, that a second stop, located in a positionally fixed fashion with respect to the housing component, for the second end of the spring-elastic wrap-around body is provided, and that, when the shaft rotates in the second rotational direction, the second stop bounds a movement of the second end of the spring-elastic wrap-around body in the second rotational direction. As a result, excessive widening of the wrap-around body can be prevented. However, a certain degree of minimum frictional force can also be achieved between the wrap-around body and the shaft if the shaft rotates again in the first rotational direction. This ensures, as it were, rapid response of the self-locking means. This can also prevent undesired idling of the shaft in the wrap-around body when switching into the first rotational direction occurs.

According to one advantageous refinement, a wrap-around body is provided which wraps around the shaft, wherein the wrap-around body is configured as a spring-elastic wrap-around body, wherein an inwardly oriented friction face is provided, and wherein the wrap-around body is arranged, for the purpose of interaction with the friction face, at least in certain sections within the inwardly oriented friction face. Developments can advantageously be implemented specifically with respect to this refinement.

The gearing mechanism can be used, for example, in an axial drive. Irrespective of the adjustment operation, such an axial drive is to be conceived in such a way that after the motor has been switched off said axial drive as far as possible does not leave its position. For example, a seat or the like is to stay in its position during travel over an uneven section of road. However, if the axial drive does operate, for example when traveling over an uneven section of road, the seat gradually lowers, which is undesired. However, these two requirements are aimed, in structural terms, at measures which rule one another out. On the one hand, a seat or the like is to be as easy as possible to raise, which can be achieved by means of a good degree of efficiency of the system in the upward direction. On the other hand, the highest possible degree of self-locking is required, which can be achieved through a poor degree of efficiency of the system in the downward direction. In order to counteract operation, it is conceivable for the measures which lower the level of efficiency, for example brake elements, to be used. However, such brake elements act in both directions of movement of the drive, with the result that the raising of the seat is also impeded. This lowers the efficiency of the system in the upward direction. As a result, the braking torque has to be compensated in the upward direction by means of a relatively high torque on the motor component, which requires a larger amount of material to be used and therefore also increases the weight. For example iron, copper and magnetic materials can be used as materials.

Therefore, for example for an adjustment operation for a seat which is implemented by means of an axial drive, a system is advantageous which as far as possible does not exert any influence on the overall efficiency level of the seat adjustment drive in the upward movement, and which promotes the self-locking when the force is reversed, that is to say in a case in which the system is loaded in the downward direction. This can be advantageously implemented by means of the spring-elastic wrap-around body.

In addition, systems in which a relatively high degree of self-locking is achieved in the stationary state and is reduced when the axial drive operates in any desired direction, are also conceivable.

Therefore, one or more advantages can be implemented depending on the consideration. Different degrees of efficiency which correspond to the respective requirements can be achieved in the drive independently of the rotational direction. It is also possible for different degrees of efficiency to be achieved in the drive as a function of rotational speed but independently of the rotational direction. In addition, an advantageous configuration of the motor can be made possible, in particular with optimized torque, since there is no need to increase the motor torque in order to compensate losses of efficiency owing to increased self-locking requirements.

It is also advantageous that the inwardly oriented friction face is configured at least partially as a cylindrical-casing-shaped friction face. This brings about advantageous interaction of the spring-elastic wrap-around body with the friction face. In this context, a certain degree of tolerance can also be obtained by means of an enlarged friction face, with the result that reliable self-locking is also achieved, for example, in the case of adjustments of the wrap-around body occurring along an axis.

It is also advantageous that the inwardly oriented friction face is configured on a friction bushing, and that the friction bushing is arranged in a rotationally fixed fashion with respect to the housing component in which the shaft is mounted. Specifically it is advantageous here that the friction bushing is connected to the housing component. The friction bushing can at the same time advantageously serve as a bearing bushing for the shaft here. This permits optimized configuration of the gearing mechanism. In addition, the friction face is reliably centered with respect to the shaft.

It is advantageous that, when the shaft rotates in the first rotational direction, the wrap-around body is stretched in certain sections in such a way that a cross section of the wrap-around body against the shaft decreases and/or a force pressing the wrap-around body against the shaft increases. Depending on the configuration and design, it is also possible here that given a correspondingly large force pressing on the shaft the wrap-around body is seated in a fixed fashion. Specifically, in this context approximately half the spring-elastic wrap-around body can be stretched in such a way that the cross section of the wrap-around body decreases in this half and/or the force pressing the wrap-around body against the shaft increases.

It is also advantageous that, when the shaft rotates in the first rotational direction, the wrap-around body is stretched in certain sections in such a way that a cross section of the wrap-around body against the friction face decreases and/or a force pressing the wrap-around body against the friction face decreases. Depending on the configuration and design, it is also possible here that the wrap-around body slips against the friction face essentially without friction. Specifically, the other half of the wrap-around body, which is arranged against the friction face, can be stretched in such a way that the cross section of this half of the wrap-around body decreases and/or a force pressing the wrap-around body against the friction face decreases.

It is advantageous that the wrap-around body is arranged in certain sections on the shaft and, if appropriate, spaced apart from the friction face, and, if appropriate, spaced apart in certain sections from the shaft, and on the friction face. Specifically, one half of the wrap-around body can be arranged against the shaft, while the other half of the wrap-around body is arranged against the friction face. It is also advantageous here that the wrap-around body has, at least in an initial state, a relatively small cross section in the section arranged against the shaft, and a relatively large cross section in the section arranged against the friction face.

It is also advantageous that, when the shaft rotates in the second rotational direction, the wrap-around body is compressed in certain sections in such a way that a cross section of the wrap-around body against the shaft increases and/or a force pressing the wrap-around body against the shaft decreases. In this context it is possible, depending on the design, also to bring about slipping of the wrap-around body against the shaft. In addition it is advantageous, when the shaft rotates in the second rotational direction, that the wrap-around body is compressed in such a way that a cross section of the wrap-around body against the friction face increases and/or a force pressing the wrap-around body against the friction face increases. Here, depending on the design it is also possible to cause the wrap-around body to be seated in a fixed fashion against the friction face.

The gearing mechanism can be adapted by means of the design and configuration of the wrap-around body as well as of the shaft and of the friction face. Specifically, the slipping moments against the shaft and the friction face can be configured differently as a function of the rotational direction. As a result, the wrap-around body can be used to implement a brake which applies different braking torques depending on the rotational direction.

It is advantageous that, in an initial state, the wrap-around body is prestressed with respect to the shaft and prestressed with respect to the friction face. It is also advantageous that the prestresses, provided in the initial state of the wrap-around body, with respect to the shaft and with respect to the friction face are predefined with different magnitudes. As a result, braking torques can already be generated in the initial state. In addition, the braking torques can be of different magnitudes depending on the rotational direction.

A relatively large braking torque can be advantageously achieved between the wrap-around body acting as a spring and the friction face, for example, by virtue of a relatively large degree of overlap, and a relatively small braking torque can be achieved between the wrap-around body and the shaft by means of a relatively small degree of overlap. The overlap provides the difference here between the external diameter of the wrap-around body and the diameter of the friction face or between the internal diameter of the wrap-around body and the diameter of the shaft, in the sense of an excess dimension. This permits rotational-direction-dependent torques to be predefined.

In accordance with one possible configuration of the gearing mechanism at least one brake element is advantageously provided, wherein the shaft has a brake element receptacle which at least partially holds the brake element, and wherein a contact face is assigned to the brake element for the purpose of interaction with the brake element. In this context, a plurality of brake elements can also be provided. It is specifically advantageous that, with respect to a rotational axis of the shaft, a further brake element lying opposite is assigned to the brake element. It is also advantageous that a plurality of brake elements are provided and distributed uniformly over the circumference of the shaft.

It is advantageous that a bearing face is provided which has the contact face mounted on the bearing face in the housing component. As a result, on the one hand, a compact configuration is implemented. On the other hand, reliable centering of the contact face with respect to the brake element is provided.

The brake element receptacle is advantageously formed by a recess which is formed in the shaft. The brake element can advantageously be inserted into this recess.

It is advantageous that the brake element has a spring and a braking wedge and that the spring applies a spring force to the braking wedge in the direction of the contact face. This ensures contact of the braking wedge with the contact face independently of the instantaneous rotational position of the shaft, wherein a certain minimum degree of static friction can be achieved by prestressing the spring.

In addition it is advantageous that the brake element is configured as a single-piece brake element, that the brake element has a wedge-shaped component, which serves as a braking wedge, that the brake element has a sprung component which serves as a spring, and that the sprung component applies a spring force to the wedge-shaped component in the direction of the contact face. For example, the brake element can be formed from a bent piece of metal. This ensures simple mounting, cost-effective configuration and a high degree of reliability.

It is also advantageous that, when the shaft rotates in the first rotational direction, the braking wedge is pulled out of the brake element receptacle by the interaction of the brake element with the contact face, and/or a force pressing the braking wedge against the contact face increases. During the rotation in the first rotational direction, the contact face as it were entrains the braking wedge, as a result of which the friction force between the contact face and the braking wedge increases. Depending on the design it is also possible to cause the shaft to be blocked.

In addition it is advantageous that, when the shaft rotates in the second rotational direction, the braking wedge is pressed into the brake element receptacle by the interaction of the brake element with the contact face, and/or a force pressing the braking wedge against the contact face decreases. When rotation occurs in the second rotational direction, the braking wedge is, as it were, pressed in to the brake element receptacle, in particular the recess, by the contact face counter to the spring force of the spring. Depending on the design and configuration, at least essentially friction-free freewheeling of the shaft can be achieved here. When the shaft is stopped, the spring force again brings about contact between the braking wedge and the contact face in order to bring about braking or stopping with respect to a possible rotation in the first rotational direction. This makes it possible to prevent undesired slipping when the rotational direction changes.

BRIEF DESCRIPTION OF THE DRAWINGS

Preferred exemplary embodiments of the invention are explained in more detail in the following description on the basis of the appended drawings in which corresponding elements are provided with corresponding reference symbols. In said drawings.

DETAILED DESCRIPTION

Figure 1:
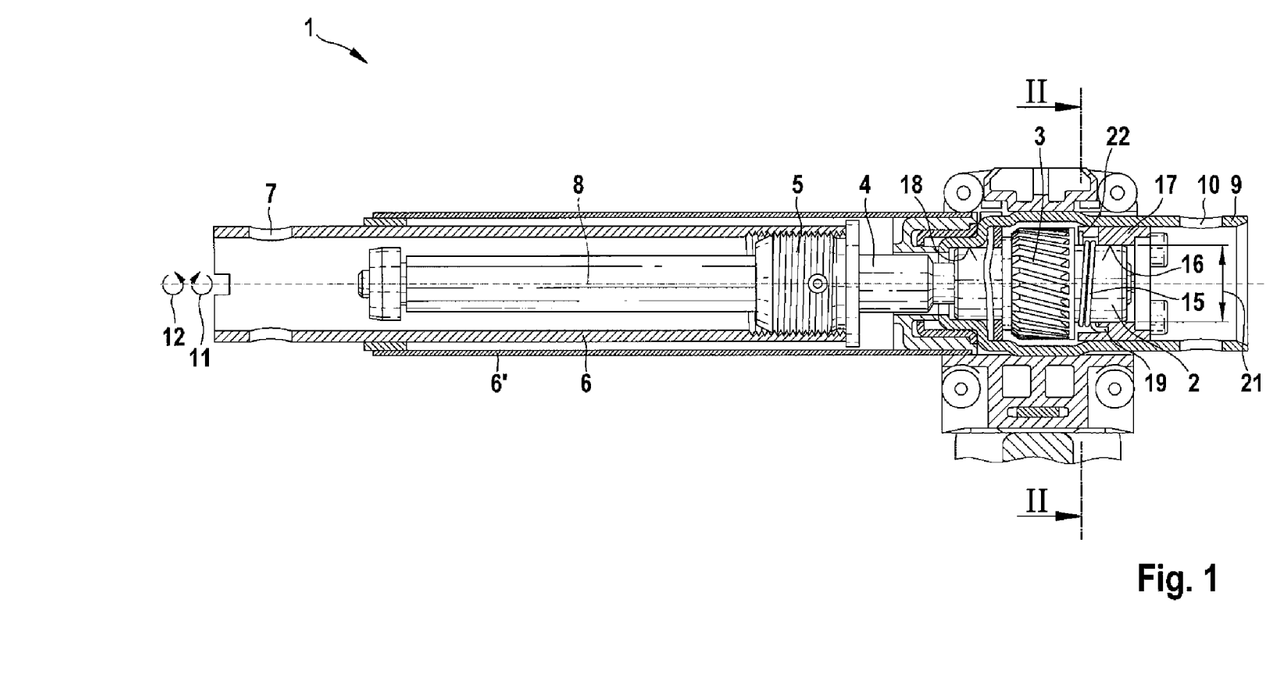
FIG. 1 is a schematic, axial sectional illustration of a gearing mechanism corresponding to a first exemplary embodiment of the invention.

FIG. 1 shows a gearing mechanism 1 in an axial schematic sectional illustration showing a detail of a first exemplary embodiment of the invention. The gearing mechanism 1 is configured in this exemplary embodiment as a worm gearing mechanism and is suitable, in particular, for devices for power-operated adjustment of elements of a motor vehicle. The gearing mechanism 1 is specifically suitable for a device for adjusting seats, in particular for the vertical adjustment of seats. The gearing mechanism 1 according to the invention is, however, also suitable for other applications.

FIG. 1 illustrates the gearing mechanism 1 in the form of a spindle assembly. The gearing mechanism 1 has a worm gear 2 which is driven by means of a worm toothing 3 by an electric motor (not illustrated), on the rotor shaft of which there is a worm which corresponds to the worm gear toothing. The worm gear 2 is connected here in a rotationally fixed fashion to a spindle 4. A spindle nut 5, which is connected in a rotationally fixed fashion to an adapter 6, is arranged on the spindle 4. In this exemplary embodiment, an attachment drill hole 7, which forms an interface, is provided on the adapter 6. The spindle nut 5 can be moved along an axis 8 of the spindle 4.

The adapter 6 is surrounded in sections by a guiding tube 6'. In this context, when activation occurs the adapter 6 can be moved out of the guiding tube 6' or moved into the guiding tube 6'.

Furthermore, a casing tube 9 is provided which has an attachment drill hole 10. A further interface, which faces away from the adapter 6, is predefined by the attachment drill hole 10 of the casing tube 9.

The guiding tube 6' and the casing tube 9 are in two parts in this exemplary embodiment, that is to say are formed from two components. The casing tube 9 serves mainly for the purpose of mounting and attachment. The guiding tube 6' supports the adapter 6 when large pressure forces occur.

The guiding tube 6' therefore forms a bending protection for the adapter 6. However, it is also possible for the guiding tube and the casing tube 9 to be formed in one part, that is to say from a single component.

The worm gear 2 is mounted in the casing tube 9. The adapter 6 and the casing tube 9 are connected in a rotationally fixed fashion, with respect to the axis 8, with the desired structures. Depending on the rotational direction of the worm gear 2, the spindle nut 5, and with it the adapter 6, moves along the axis 8 in relation to the casing tube 9.

For example, the adapter 6 can be moved out of the guiding tube 6' in order to permit a seat to be raised within the scope of a process of vertical adjustment of the seat. An electric motor, which acts via the gearing mechanism 1, must overcome, in addition to the resistances arising from the seat structure, in particular the weight and the friction, also the weight of a person sitting on the seat. In the upward movement, that is to say in this case when the adapter 6 moves out, the electric motor must therefore apply a force which is larger than the sum of the forces acting on the seat structure and the weight of the person. On the other hand, in the case of an upward movement of the seat, during which the adapter 6 moves into the guiding tube 6', the electric motor is assisted in its direction of movement by the weight forces. As a result, the force which is required for lowering is reduced by the weight of the person and the weight of the seat. Depending on the frictional relationships it is even possible for the drive to change over from the driving state into the driven state.

However, the gearing mechanism 1 of the exemplary embodiment is configured in such a way that when the adapter 6 moves into the guiding tube 6' additional self-locking occurs. As a result, on the one hand, a good degree of efficiency can be achieved, which has a favorable effect during the raising of a seat or the like. On the other hand, self-locking can be ensured in order to prevent unintentional lowering of a seat or the like. It is specifically possible that after the electric motor switches off the seat maintains its position even if the vehicle travels over an uneven section of road or the like where there is a risk of operation.

The method of functioning of the gearing mechanism 1 for bringing about rotational-direction-dependent self-locking is described in further detail below with reference to FIGS. 1 to 4.

Figure 2:
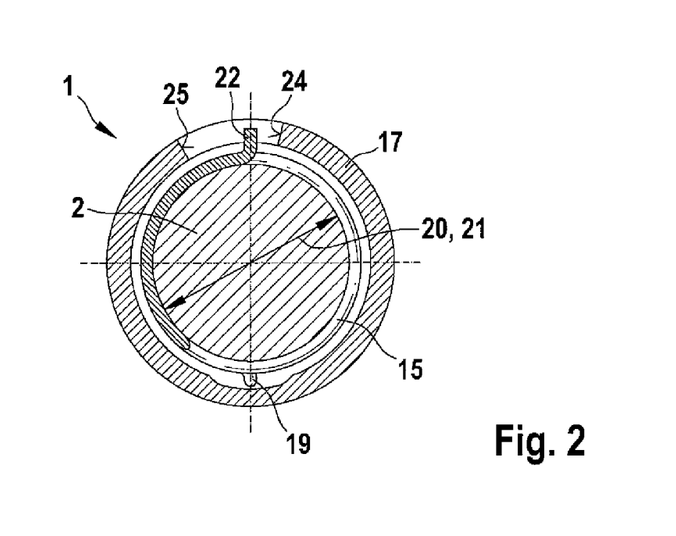
FIG. 2 is a schematic sectional illustration through the gearing mechanism shown in FIG. 1, showing a detail of the first exemplary embodiment along the sectional line denoted by II.
Figure 3:
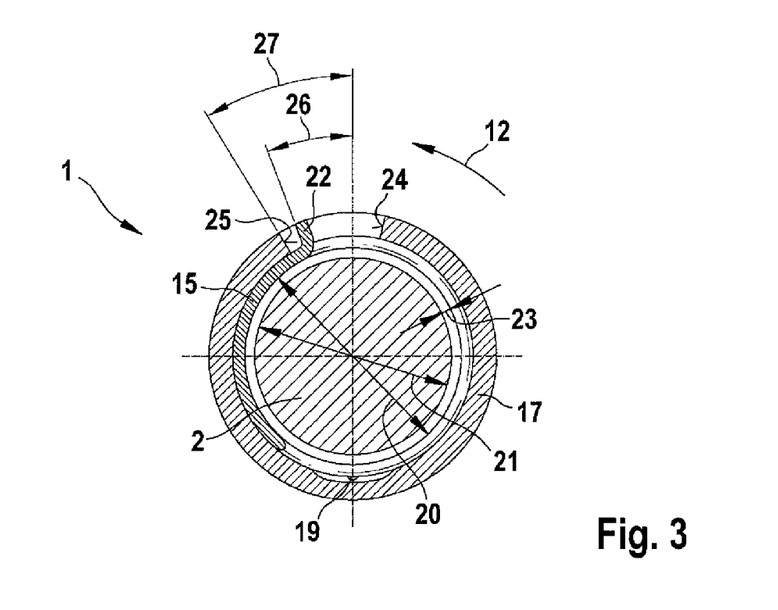
FIG. 3 shows the detail of the section through the gearing mechanism according to the first exemplary embodiment shown in FIG. 2 during a rotation of a shaft in a second rotational direction.
Figure 4:
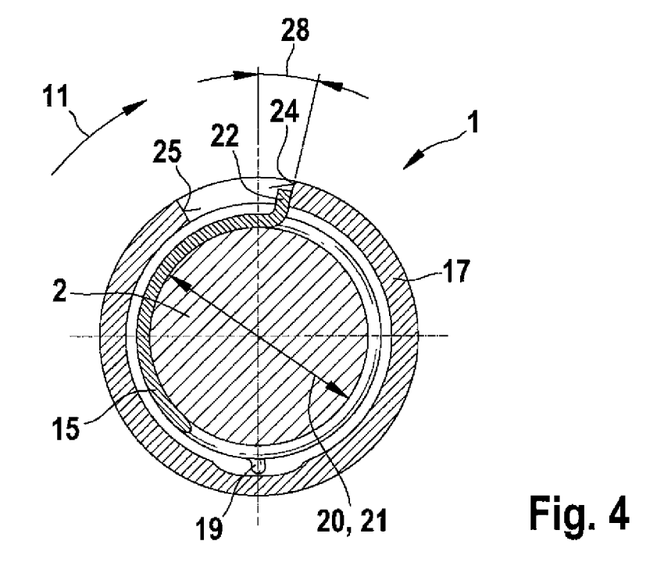
FIG. 4 shows the section through the gearing mechanism according to the first exemplary embodiment shown in FIG. 2, during a rotation of the shaft in a first rotational direction.

FIGS. 2 to 4 show details of sections through the gearing mechanism 1 illustrated in FIG. 1, along the viewing direction denoted by II. Here, FIG. 2 shows an unloaded initial state of the gearing mechanism 1. FIG. 3 illustrates a state in which the worm gear 2 of the gearing mechanism 1 rotates in a second rotational direction 12, which corresponds, for example, to the raising of a seat when the adapter 6 moves out of the guiding tube 6'. FIG. 4 illustrates a situation in which the worm gear 2 of the gearing mechanism 1 rotates in a first rotational direction 11, which corresponds, for example, to lowering of a seat, during which the adapter 6 moves into the guiding tube 6'.

The casing tube 9 represents a housing component 9 of the gearing mechanism 1. The worm gear 2 can be considered at least in certain sections as a shaft which is mounted in the housing component 9. The worm gear 2 can be driven in rotation in the first rotational direction 11 and in the second rotational direction 12, which is opposed to the first rotational direction 11. In this context, a spring-elastic wrap-around body 15 is provided which can be configured, for example, by a wrap spring. The spring-elastic wrap-around body 15 wraps around the shaft 2 repeatedly. In this context, the wrap-around body 15 bears in certain sections against the shaft 2. In this exemplary embodiment, the spring-elastic wrap-around body 15 encloses the worm gear 2 in the region of a bearing point 16, in which region the worm gear 2 can be considered as a shaft 2. The bearing point 16 is formed here by a bushing 17 which is arranged in the casing tube 9. In addition, a further bearing point 18 for the worm gear 2 is predefined within the casing tube 9, which bearing point 18 is formed by the casing tube 9.

The wrap-around body 15 is configured in the form of a wire, wherein one end 19 is secured to a limb of the wrap-around body 15 in the bushing 17. As a result, the first end 19 is secured in a positionally fixed fashion with respect to the casing tube (housing component) 9. In order to ensure this function, the bushing 17 is secured at least in a rotationally fixed fashion in the casing tube 9.

The wrap-around body 15 has a number of turns matching the requirements. In the initial state illustrated in FIG. 2, the spring-elastic wrap-around body 15 has an internal diameter 20. In addition, the shaft 2 has a diameter 21 in the region of the bearing point 16. Here, the wrap-around body 15 bears against the shaft 2 in a region in which the shaft 2 has the diameter 21. The diameter 21 of the shaft 2 and the internal diameter 20 of the wrap-around body 15 are matched to one another. Specifically, the internal diameter 20 of the untensioned wrap-around body 15 can be predefined to be smaller than the diameter 21 of the shaft 2.

While the first end 19 on the first limb of the wrap-around body 15 is secured in a rotationally fixed fashion to the bushing 17, a second end 22 on a second limb of the wrap-around body 15 is freely movable, wherein this mobility can be limited.

When the gearing mechanism 1 is assembled, the bushing 17 can be fitted, with the spring-elastic wrap-around body 15, onto the shaft 2, wherein the wrap-around body 15 widens somewhat in terms of its internal diameter 20. As a result, in the initial state a certain degree of prestressing of the wrap-around body 15 can be predefined.

FIG. 3 shows a situation in which the shaft 2, that is to say the worm gear 2, rotates in the second rotational direction 12. If the shaft 2 is, for example, initially stationary, as corresponds to the situation illustrated in FIG. 2, the shaft 2 entrains the spring-elastic wrap-around body 15 somewhat in the second rotational direction 12 owing to the friction between the wrap-around body 15 and the shaft 2. Since the wrap-around body 15 is configured in a spring-elastic fashion, it widens, as a result of which the internal diameter 20 increases compared to the initial state illustrated in FIG. 2.

If the wrap-around body 15 is prestressed in the initial state, there is initially a certain decrease in the frictional force between the wrap-around body 15 and the shaft 2 and then expansion occurs. In this context, a certain distance 23 may come about between the wrap-around body 15 and the shaft 2 in the form of an air gap.

When the shaft 2 rotates in the second rotational direction 12, a certain braking torque, which, however, decreases owing to the entrainment of the wrap-around body 15 in the second rotational direction 12 and, under certain circumstances, even disappears entirely, occurs owing to the initially prestressed wrap-around body 15. In the exemplary embodiment illustrated in FIG. 3, a first stop 24 and a second stop 25 for the second end 22 of the spring-elastic wrap-around body 15 are predefined on the bushing 17. As illustrated in FIG. 3, the second end 22 of the wrap-around body 15 is entrained out of its initial position through a certain angle 26. The magnitude of the angle 26 in the second rotational direction 12 is limited to a maximum angle 27 by the second stop 25. The maximum angle 27 can be predefined here in such a way that a negligible braking torque can be achieved when the wrap-around body 15 widens. However, the maximum angle 27 can also be predefined by the position of the second stop 25 in such a way that at least a small braking torque, that is to say a certain degree of friction, between the wrap-around body 15 and the shaft 2 is brought about in all cases. Such a configuration has the advantage that when there is a change in the rotational direction from the second rotational direction 12 into the first rotational direction 11, immediate entrainment of the second end 22 in the first rotational direction 11 is brought about. Undesired freewheeling of the shaft 2 in the wrap-around body 15 can be prevented in this way.

FIG. 4 shows the state in which the shaft 2 rotates in the first rotational direction 11. For example, a reversal of the rotational direction can occur starting from the state illustrated in FIG. 3. In this context, the second end 22 of the wrap-around body 15 is entrained in the first rotational direction 11, wherein the frictional force between the wrap-around body 15 and the shaft 2 increases since the wrap-around body 15 is stretched in the first rotational direction 11, with the result that it is wrapped more tightly around the shaft 2 and/or the pressing force is increased. This increase in the moment of friction continues until the second end 22 of the wrap-around body 15 enters into abutment with the first stop 24 of the bushing 17. The first stop 24 limits, as it were, the braking torque to a maximum value. In this exemplary embodiment, a maximum angle 28 by which the second end 22 can be rotated out of the basic position illustrated in FIG. 2 is predefined.

The position of the first stop 24 and therefore the maximum angle 28 are predefined for the respective application situation. For example, the seat adjustment drive can be assisted during lowering, that is to say during a rotation of the shaft 2 in the first rotational direction 11, by the weight of the seat and the weight of a person, with the result that an electric motor can also overcome, without adverse effects for the comfort, a certain additional braking torque which is caused by the friction between the wrap-around body 15 and the shaft 2. As a result, the maximum angle 28 can, under certain circumstances, be relatively large. In other application situations, this assistance may, however, be smaller, as a result of which a somewhat smaller value is predefined for the maximum angle 28.

Specifically it is possible for the maximum angle 28 to disappear, that is to say that a maximum angle 28 of 0° is predefined. In this case, no additional rotation of the wrap-around body 15 out of the basic position illustrated in FIG. 2 in the first rotational direction 11 is possible at all. This means that the braking torque which is generated in the basic state cannot be increased further.

Figure 5:
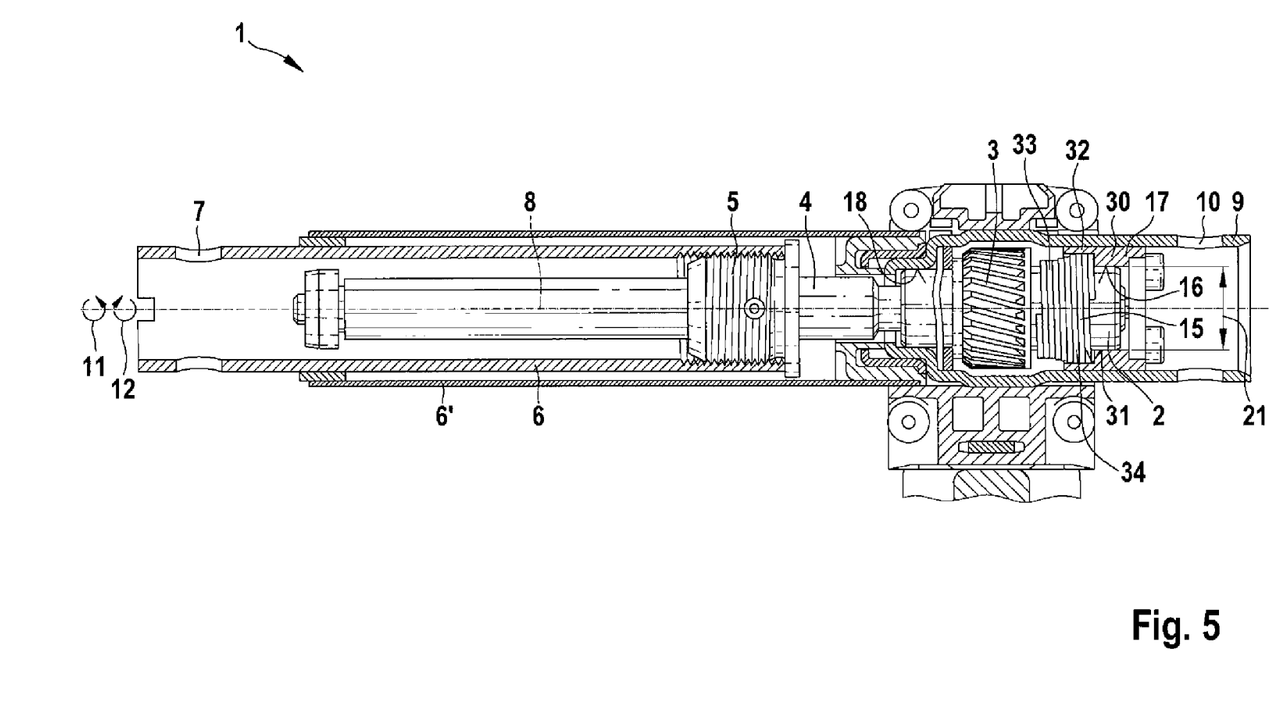
FIG. 5 shows a schematic axial sectional illustration of a gearing mechanism corresponding to a second exemplary embodiment of the invention.

FIG. 5 shows a gearing mechanism 1 in an axial, schematic sectional illustration of a detail of a second exemplary embodiment. The gearing mechanism 1 is also configured as a worm gearing mechanism in this exemplary embodiment.

In this exemplary embodiment, the bushing 17 serves for mounting the shaft 2. The shaft 2 is mounted here in a component 30 of the bushing 17. In this respect, the bushing 17 has the function of a bearing bushing 17.

Furthermore, the bushing 17 has a friction face 31. The friction face 31 is configured here on a component 32 of the bushing 17. An internal diameter of the bushing 17 is larger here in the region of the component 32 than in the region of the component 30. The bushing 17 has the function of a friction bushing 17 with respect to the friction face 31.

The bushing 17 is connected in a rotationally fixed fashion to the casing tube 9.

The spring-elastic wrap-around body 15 has, in this exemplary embodiment, a section 33 and a section 34. In this context, the sections 33, 34 can, for example, each comprise half of the wrap-around body 15. However, a different division is also possible. In the section 33, the wrap-around body 15 is arranged on the shaft 2. In the section 34, the wrap-around body 15 is arranged on the friction face 31. In this exemplary embodiment, the spring-elastic wrap-around body 15 in the section 34 has a larger diameter and therefore larger cross section than in the section 33. Specifically, the spring-elastic wrap-around body 15 in the section 34 is spaced apart from the shaft 2.

In this exemplary embodiment, the spring-elastic wrap-around body 15 serves as a slip clutch. Here, the surface of the shaft 2 interacts in the region of the section 33 with the section 33 of the spring-elastic wrap-around body 15. In addition, the inwardly oriented friction face 31 of the friction bushing 17 interacts with the section 34 of the spring-elastic wrap-around body 15. In the untensioned initial state, the diameter of the spring-elastic wrap-around body 15 can be smaller in the section 33 than the diameter 21 of the shaft 2. In addition, the section 34 of the wrap-around body 15 in the untensioned initial state can have a diameter which is larger than an internal diameter of the friction face 31 which is configured in the form of a cylindrical case. Specifically when the shaft 2 is stationary, there is therefore static friction, on the one hand, between the section 33 and the outer side of the shaft 2, and, on the other hand, between the section 34 and the friction face 31. In this context, the wrap-around body 15 bears on the inside against the shaft 2 and on the outside against the friction face 31.

When the shaft 2 rotates in the first rotational direction 11, the section 33 of the wrap-around body 15 is stretched in such a way that the cross section of the wrap-around body 15 decreases and/or a force pressing the wrap-around body 15 against the shaft 2 increases. In this context it is also possible to ensure that the wrap-around body 15 is seated in a fixed fashion on the shaft 2. The other section 34 of the wrap-around body 15 is stretched in such a way that the cross section of the wrap-around body 15 decreases and/or a force pressing the wrap-around body 15 against the friction face 31 of the bushing 17 decreases. The wrap-around body 15 therefore slips on the friction face 31 of the bushing 17.

When the shaft 2 rotates in the second rotational direction 12, the section 33 of the wrap-around body 15 is compressed in such a way that a cross section of the wrap-around body 15 increases and/or a force pressing the wrap-around body 15 against the shaft 2 decreases. The wrap-around body 15 therefore slips on the shaft 2. In section 34, the wrap-around body 15 is compressed in such a way that the cross section of the wrap-around body 15 increases and/or a force pressing the wrap-around body 15 against the friction face 31 of the bushing 17 increases. The wrap-around body 15 is therefore supported on the friction face 31 of the bushing 17.

The respectively occurring slipping torques can be configured differently as a function of the rotational direction, specifically either of the first rotational direction 11 or the second rotational direction 12. This provides a brake which implements different braking torques depending on the rotational direction.

Depending on the design and the temperature of use, the section 33 of the spring-elastic wrap-around body 15 can be stretched in the first rotational direction 11 in such a way that a cross section of the wrap-around body 15 decreases and/or a force pressing the wrap-around body 15 against the shaft 2 increases, as a result of which the wrap-around body 15 is seated in a fixed fashion on the shaft 2. If the section 34 of the spring-elastic wrap-around body 15 is compressed in such a way that a cross section of the wrap-around body 15 increases and/or a force pressing the wrap-around body 15 against the friction face 31 increases, it is then possible to ensure that the wrap-around body 15 is seated in a fixed fashion on the friction face 31 of the bushing 17.

Figure 6:
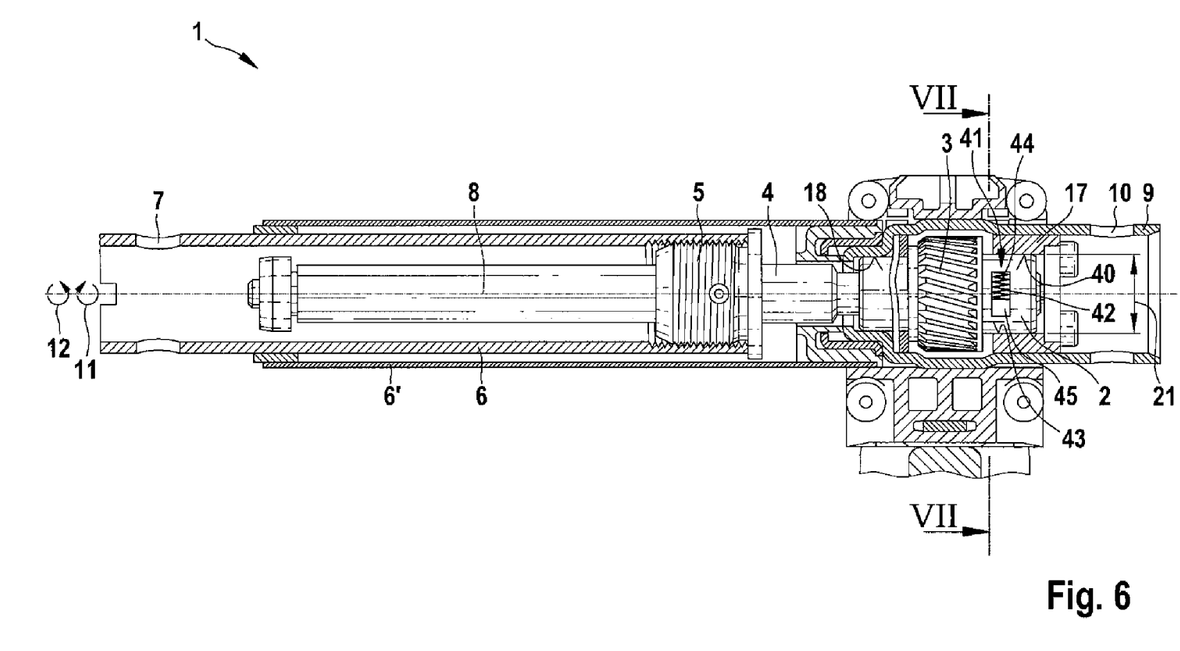
FIG. 6 shows a schematic axial sectional illustration of a gearing mechanism corresponding to a third exemplary embodiment of the invention.

FIG. 6 shows a gearing mechanism 1 in an axial, schematic sectional illustration of a detail of a third exemplary embodiment. In this exemplary embodiment, the shaft 2 is mounted on a bearing face 40 of the bushing 17. The bushing 17 is configured here as a bearing bushing 17. In addition, at least one brake element 41 is provided which is arranged in the region of the bearing face 40. As a result, interaction of the brake element 41 with the bearing face 40 is made possible.

The shaft 2 has a brake element receptacle 42 which is formed by a recess 42 in the shaft 2. The brake element 41 is inserted at least partially into the brake element receptacle 42. A component 43 of the bearing face 40 serves as a contact face 43. The brake element 41 interacts with the contact face 43.

The brake element 41 has a spring 44 and a braking wedge 45. Here, the spring 44 acts on the braking wedge 45 in the direction of the contact face 43, which is part of the bearing face 40.

Figure 7:
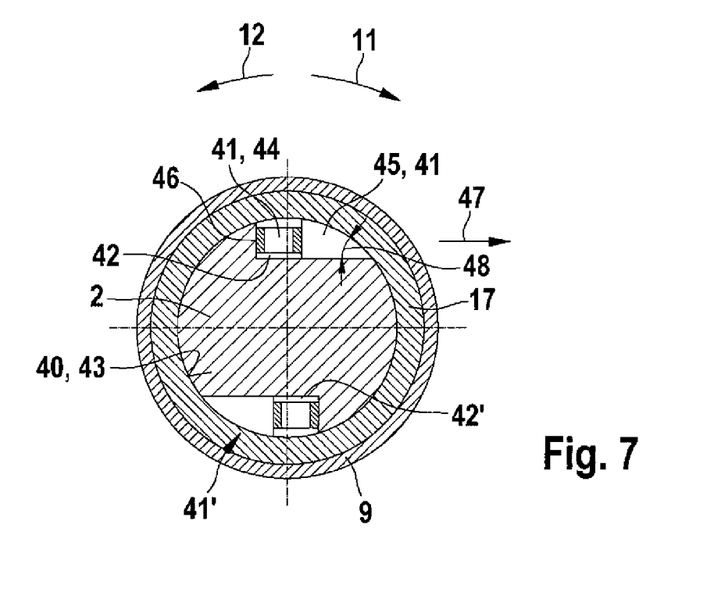
FIG. 7 shows a schematic sectional illustration through the gearing mechanism shown in FIG. 6, showing a detail of the third exemplary embodiment along the sectional line denoted by VII.

FIG. 7 shows a schematic sectional illustration of a detail of the third exemplary embodiment of the gearing mechanism 1 illustrated in FIG. 6, along the sectional line denoted by VII. The brake element 41 is configured in two parts in this exemplary embodiment. Here, the spring 44 is arranged in the brake element receptacle 42. The spring 44 is supported here on a face 46 of the shaft 2 in order to apply a spring prestress to the braking wedge 45. As a result, the braking wedge 45 is pressed against the contact face 43 by the spring 44 in a direction 47.

When the shaft 2 rotates in the first rotational direction 11, the braking wedge 45 is pulled out of the brake element receptacle 42 by the interaction with the contact face 43, as a result of which a force pressing the braking wedge 45 against the contact face 43 increases. The braking wedge 45 has here a wedge angle 48. The braking torque which occurs can be predefined within certain limits by predefining the wedge angle 48. A sufficiently large selection is made here for the wedge angle 48 so that physical self-locking of the braking wedge 45 is prevented during rotation in the first rotational direction 11.

When the shaft 2 rotates in the second rotational direction 12, the braking wedge 45 is pulled into the brake element receptacle 42 in the direction opposed to the direction 47 by the interaction with the contact face 43. This reduces the braking effect. In this context it is also possible for an at least essentially negligible braking effect to occur.

It is therefore possible to implement a different braking effect depending on the rotational direction. As a result it is possible to bring about rotational-direction-dependent self-locking.

Further brake elements 41', which are inserted into brake element receptacles 42' of the shaft 2, are advantageously provided on the shaft 2. This permits the braking effect to be improved. Specifically, by means of an arrangement of the brake elements 41, 41' opposite one another it is possible to ensure that a braking torque is at least essentially applied to the shaft 2 and lateral forces acting on the shaft 2, which have to be taken up by a bearing or the like, are avoided.

Figure 8:
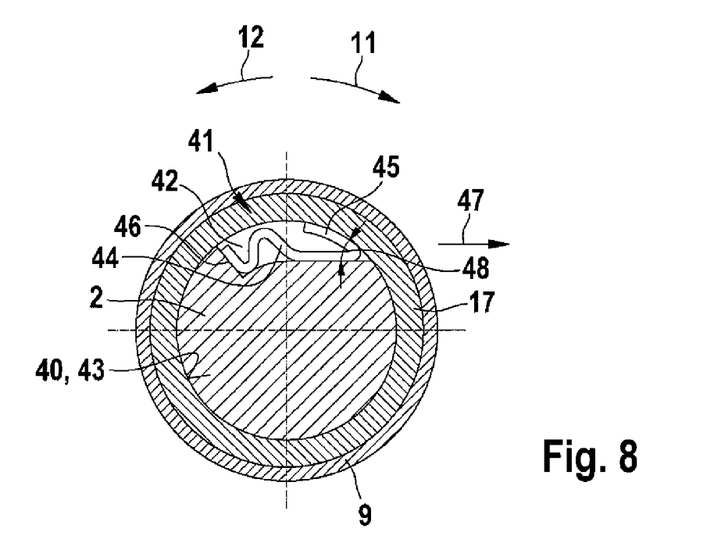
FIG. 8 shows the section through the gearing mechanism illustrated in FIG. 6, showing a detail of a fourth exemplary embodiment of the invention.

FIG. 8 shows the section, shown in FIG. 7, through the gearing mechanism 1 according to a fourth exemplary embodiment. In this exemplary embodiment, the brake element 41 is configured as a single-piece brake element 41. Here, a wedge-shaped component 45 of the brake element 41 serves as a braking wedge 45. Furthermore, a sprung component 44 of the brake element 41 serves as a spring 44. The sprung component 44 presses the wedge-shaped component 45 in the direction 47 against the contact face 43 with a spring force. When the shaft 2 is stationary, a certain holding force is therefore generated.

The brake element 41 can be formed from a bent workpiece. Here, the spring constant of the spring 44 can be predefined. Furthermore, it is possible, in particular, to predefine a wedge angle 48.

When the shaft 2 rotates in the first rotational direction 11, the force pressing the braking wedge 45 against the contact face 43 is increased. As a result, the braking torque acting on the shaft 2 increases. Conversely, when a shaft 2 rotates in the second rotational direction 12, the force pressing the braking wedge 45 against the contact face 43 decreases, with the result that a braking torque decreases and is, under certain circumstances, at least essentially eliminated.

Different braking torques can therefore be generated as a function of the selected rotational direction 11, 12.

The invention is not restricted to the exemplary embodiments described.

What is claimed is:

1. A gearing mechanism (1) comprising a housing component (9) and a shaft (2) which is mounted in the housing component (9) and is configured to be driven in rotation in relation to the housing component (9) about a rotational axis (8) in a first rotational direction (11) and in a second rotational direction (12) which is opposed to the first rotational direction (11), wherein a wrap-around body (15) is provided which wraps around the shaft (2), the wrap-around body (15) is configured as a spring-elastic wrap-around body (15), a radially inwardly oriented friction face (31) is provided on the housing component (9) at an axial end of the wrap-around body, and the wrap-around body (15) is arranged, for the purpose of frictional interaction with the radially inwardly oriented friction face (31), at least in certain sections within the inwardly oriented friction face (31), wherein the wrap-around body (15) includes a first section (34) having a larger diameter than a second section (33), and wherein the second section (33) wraps at least once around the shaft (2), and further wherein the wrap-around body (15) serves as a slip clutch to provide differing braking torques as a function of the first rotational direction (11) and the second rotational direction (12).

2. The gearing mechanism as claimed in claim 1, wherein the inwardly oriented friction face (31) is configured at least partially as a cylindrical-casing-shaped friction face (31),
and/or
the inwardly oriented friction face (31) is configured on a friction bushing (17), and the friction bushing (17) is arranged in a rotationally fixed fashion with respect to the housing component (9) in which the shaft (2) is mounted, and/or the friction bushing (17) is connected to the housing component (9).

3. The gearing mechanism as claimed in claim 1, wherein, when the shaft (2) rotates in the first rotational direction (11), the wrap-around body (15) is stretched in certain sections in such a way that a cross section of the wrap-around body (15) against the shaft (2) decreases and/or a force pressing the wrap-around body (15) against the shaft (2) increases, and/or in that, when the shaft (2) rotates in the first rotational direction (11), the wrap-around body (15) is stretched in certain sections in such a way that a cross section of the wrap-around body (15) against the inwardly oriented friction face (31) decreases and/or a force pressing the wrap-around body (15) against the inwardly oriented friction face (31) decreases.

4. The gearing mechanism as claimed in claim 3, wherein, in an initial state, the wrap-around body (15) is prestressed with respect to the shaft (2) and prestressed with respect to the inwardly oriented friction face (31).

5. The gearing mechanism as claimed in claim 4, wherein the prestresses, provided in the initial state, of the wrap-around body (15) with respect to the shaft (2) and with respect to the inwardly oriented friction face (31) are predefined with different magnitudes.

6. The gearing mechanism as claimed in claim 1, wherein the wrap-around body (15) is arranged in certain sections on the shaft (2) and, if appropriate, spaced apart from the inwardly oriented friction face (31), and, if appropriate, spaced apart in certain sections from the shaft (2), and on the inwardly oriented friction face (31), and/or the wrap-around body (15) has, at least in an initial state, a relatively small cross section in the section (33) arranged against the shaft (2), and a relatively large cross section in the section (34) arranged against the inwardly oriented friction face (31), and/or when the shaft (2) rotates in the second rotational direction (12), the wrap-around body (15) is compressed in certain sections in such a way that a cross section of the wrap-around body (15) against the shaft (2) increases and/or a force pressing the wrap-around body (15) against the shaft (2) decreases, and/or when the shaft (2) rotates in the second rotational direction (12), the wrap-around body (15) is compressed in such a way that a cross section of the wrap-around body (15) against the inwardly oriented friction face (31) increases and/or a force pressing the wrap-around body (15) against the inwardly oriented friction face (31) increases.

7. The gearing mechanism as claimed in claim 1, wherein the housing component (9) is configured as a casing tube (9) in which the shaft (2) is arranged at least in certain sections, and/or a worm gear (2) is provided which is connected to the shaft (2) or configured in one piece with the shaft (2).

8. The gearing mechanism as claimed in claim 1, wherein in an initial state, a diameter of the wrap-around body (15) is smaller in the second section (33) than a diameter (21) of the shaft (2).

9. The gearing mechanism as claimed in claim 1, wherein when the shaft (2) is stationary, there is a static friction between the second section (33) and an outer side of the shaft (2) and between the first section (34) and the inwardly oriented friction face (31).

10. The gearing mechanism as claimed in claim 1, wherein respectively occurring slipping torques are configured differently as a function of either the first rotational direction (11) or the second rotational direction (12), thereby providing a brake which implements different braking torques depending on the rotational direction.

* * * * *